United States Patent
Challoner et al.

Patent Number: 5,816,538
Date of Patent: *Oct. 6, 1998

[54] DYNAMIC DECOUPLER FOR IMPROVED ATTITUDE CONTROL

[75] Inventors: A. Dorian Challoner, Manhattan Beach; Harold A. Rosen, Santa Monica, both of Calif.

[73] Assignee: Hughes Electronics Corporation, Los Angeles, Calif.

[*] Notice: The terminal 13 months of this patent has been disclaimed.

[21] Appl. No.: 322,859

[22] Filed: Oct. 13, 1994

[51] Int. Cl.$^6$ ............... B64G 1/38; B64G 1/28; G05D 2/08

[52] U.S. Cl. ............. 244/170; 244/165; 244/176; 244/195

[58] Field of Search ................. 244/176, 190, 244/195, 170, 165, 164; 364/434

[56] References Cited

U.S. PATENT DOCUMENTS

| | | | |
|---|---|---|---|
| 3,695,554 | 10/1972 | Phillips | 244/170 |
| 3,830,447 | 8/1974 | Phillips | 244/170 |
| 4,096,427 | 6/1978 | Rosen et al. | 244/170 |
| 4,272,045 | 6/1981 | Phillips | 244/170 |
| 4,370,716 | 1/1983 | Amieux | 364/434 |
| 4,426,052 | 1/1984 | Hubert et al. | 244/168 |
| 4,504,032 | 3/1985 | Phillips et al. | 244/170 |
| 4,824,052 | 4/1989 | Smay et al. | 244/170 |
| 4,913,548 | 4/1990 | Vick | 356/350 |
| 5,042,752 | 8/1991 | Surauer et al. | 244/170 |
| 5,172,323 | 12/1992 | Schmidt | 364/453 |
| 5,438,404 | 8/1995 | Hamilton et al. | 356/152.2 |
| 5,452,869 | 9/1995 | Basuthakur et al. | 244/164 |

*Primary Examiner*—Andres Kashnikow
*Assistant Examiner*—Virna Lissi Mojica
*Attorney, Agent, or Firm*—Terje Gudmestad; Elizabeth E. Leitereg; Michael W. Sales

[57] ABSTRACT

The invention provides a method for controlling the precession of a spinning spacecraft (20) which allows the spacecraft body to respond to an input torque without the nutation normally attendant when an input torque is applied about one transverse axis to accelerate a spinning spacecraft about that one axis. Dynamic decoupling eliminates nutation through the impression of additional derived feedback torques (44,46) to the input torque control of a spinning spacecraft to oppose or cancel the intrinsic cross-coupling terms (34,36) of the spinning spacecraft's gyrodynamics that give rise to the nutation. Thus, a single spacecraft design can provide the benefits of a spinning bus such as a simplified thruster control system for orbit control, improved temperature environment for many payload elements, spin-averaging of body-fixed disturbances and gyro drift errors, and propellant management as well as the major benefit of a body-stabilized or non-rotation spacecraft design which is freedom from nutation and hence improved performance.

12 Claims, 2 Drawing Sheets

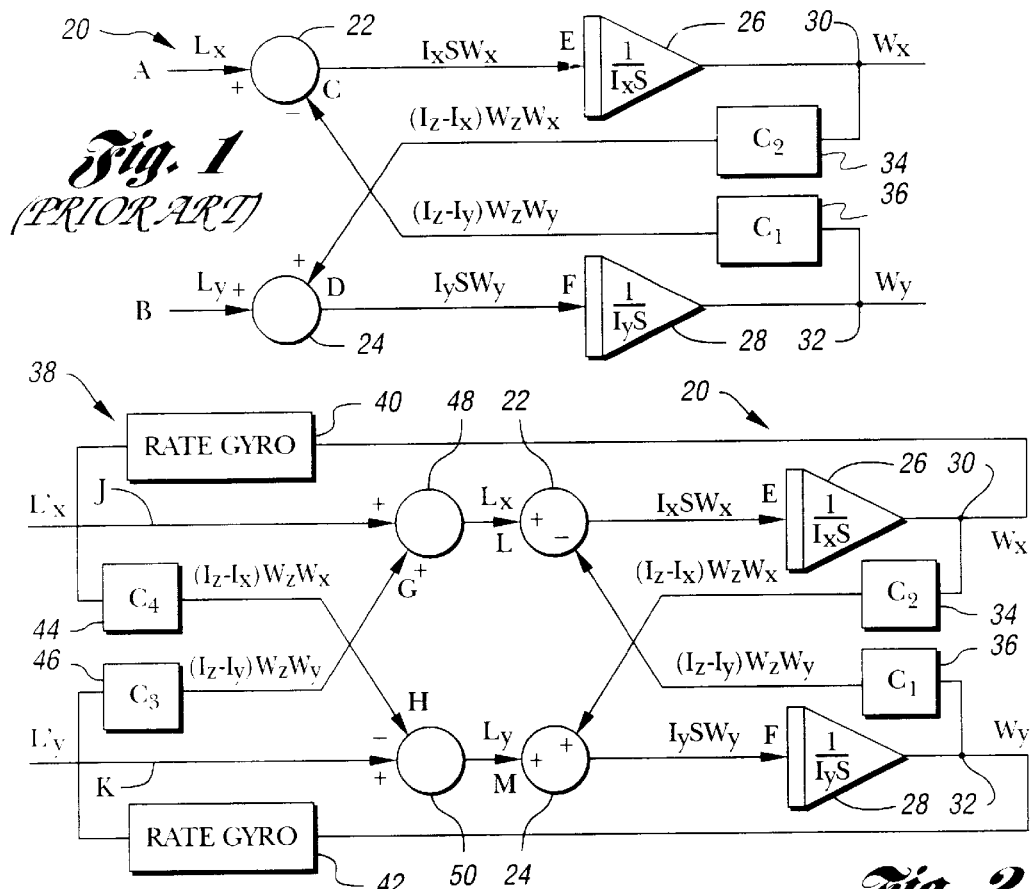
Fig. 1 (PRIOR ART)
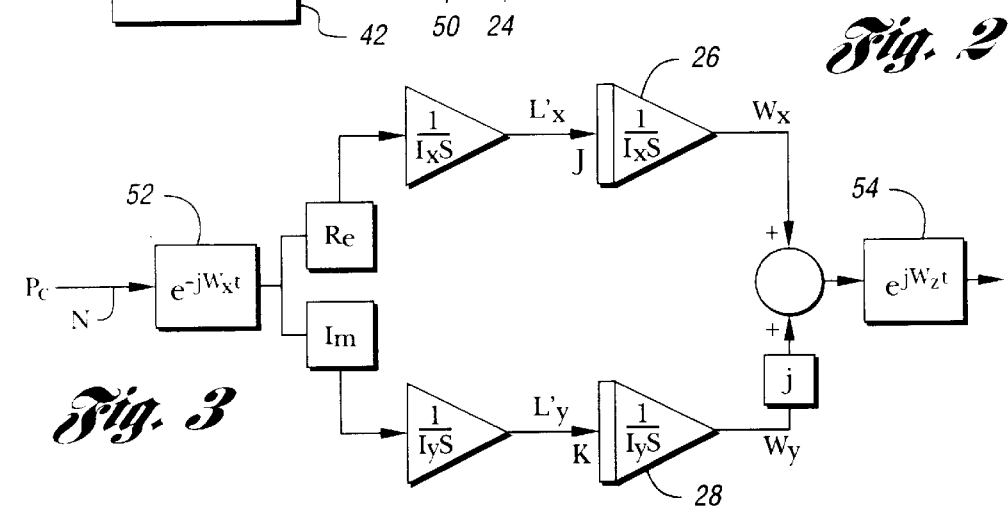
Fig. 2
Fig. 3
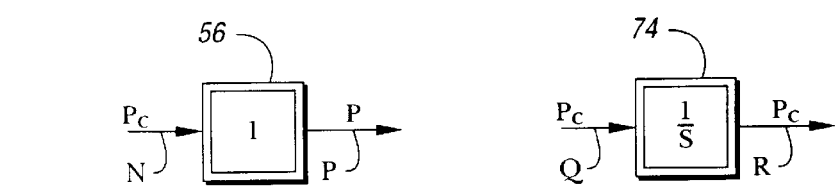
Fig. 4  Fig. 6

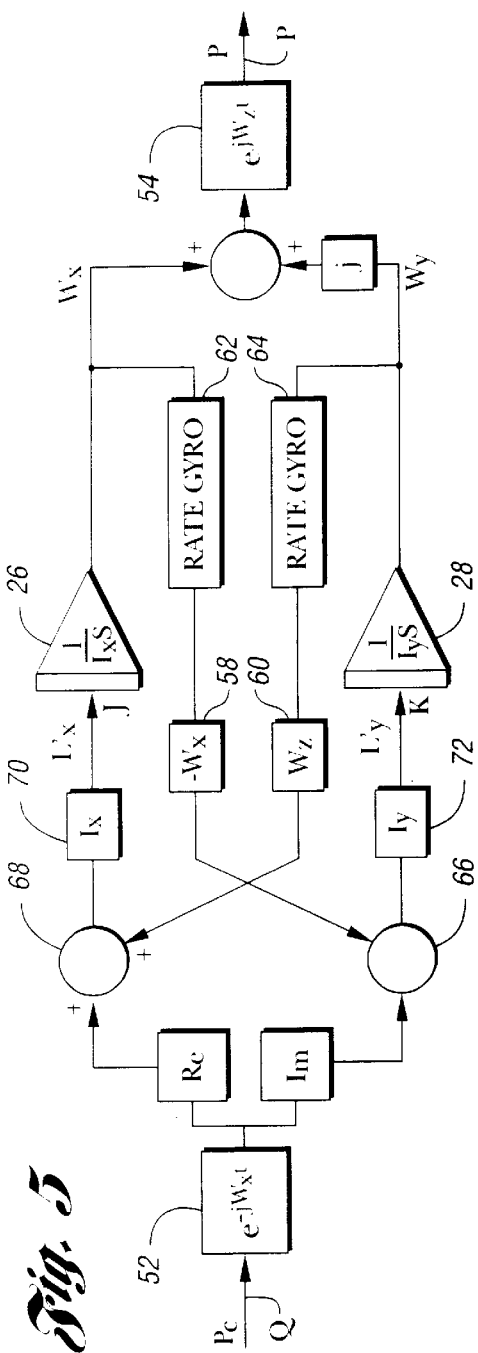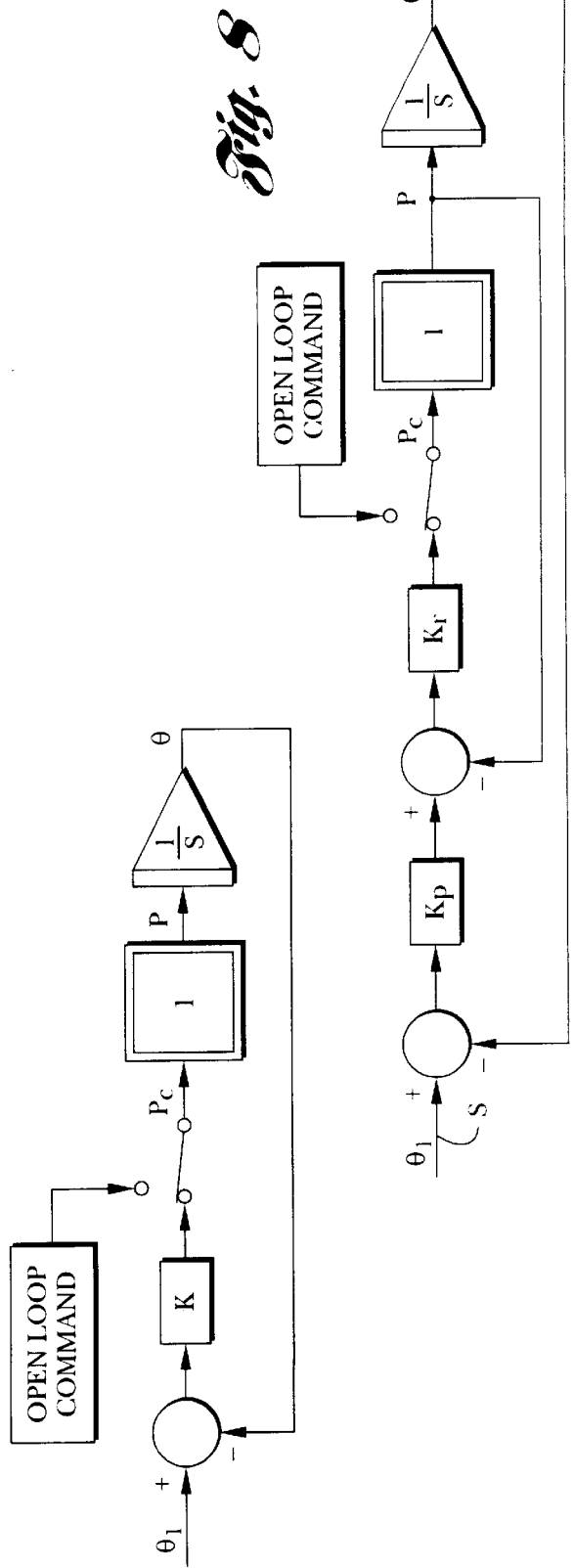

DYNAMIC DECOUPLER FOR IMPROVED ATTITUDE CONTROL

BACKGROUND OF THE INVENTION

1. Field of Invention

The invention relates to an apparatus and related method for controlling the direction or precession of a spinning spacecraft which allows the spacecraft body to respond to two input control torques with rotation about one transverse axis without nutation. More particularly, the invention relates to a dynamic decoupling apparatus and related method for eliminating the nutation of a spinning spacecraft involving the impression of derived feedback torques in addition to normal input control torques to oppose or cancel the intrinsic cross-coupling torques of the spinning spacecraft's gyrodynamics that give rise to the attendant nutation.

2. Background Art

Design of attitude control systems for spinning spacecraft has traditionally emphasised very light spacecraft weight requirements and thus employed single thruster axis control using a single input control torque to cause the spacecraft to precess. Disadvantageously, single axis attitude control systems invariably introduce attendent wobbling and nutation. Conventional attitude control systems typically address the issues of precession and nutation damping using separate control schemes. Some nutation damping schemes themselves produce even further nutation and attitude error. As precise spacecraft attitude control becomes increasingly more important, and as thruster control about an additional axis becomes more commonplace, the need arises for an improved method to control spacecraft attitude utilizing dual axis torque control without the nutation characteristics of single axis attitude control systems.

Nutationless open loop precession of a symmetrical spacecraft is known in the art. A method for designing closed-loop gyro-based control of a slowly spinning symmetrical spacecraft has also been a subject of interest in the development of Spin Axis Wobble Control systems. However, an even more useful method for closed-loop gyro-based control of the precession of an asymmetric spacecraft is desirable.

Thus, there is a need in the art for a more agile attitude control method which permits the precession of a spinning spacecraft to be interrupted, such as during the starts and stops of precession maneuvers, which does not introduce nutation requiring damping.

SUMMARY OF THE INVENTION

The present invention involves impressing gyro rate derived feedback or dynamic decoupling torques on each of two transverse orthogonal axes of a spinning spacecraft to cancel the cross coupling terms implicit in the gyrodynamics of a spinning body. The introduction of dynamic decoupling torques allows the spinning body to respond to control torque input without nutation.

Thus, according to one aspect of the present invention, an attitude control system is described for controlling the precession of a spinning spacecraft including means responsive to the angular rates of x and y transverse axes for cancelling intrinsic cross-coupling torques.

According to another aspect of the present invention, a method is described for designing a closed-loop attitude control system for a rotating spacecraft having the steps of, applying input attitude control torques to change the direction of the inertial spin axis resulting in the creation of cross-coupling torques about x and y transverse axes, generating compensating signals to offset the cross-coupling torques, and altering the input attitude control torques based on the compensating signals to offset the effects of the intrinsic cross-coupling torques.

Other objects, features and advantages will become clear or will be made apparent during the course of the following description of the preferred embodiment of the present invention.

BRIEF DESCRIPTION OF THE DRAWINGS

FIG. 1 is a block diagram of the spacecraft gyrodynamic system model representing mathematical equations used to describe the rotation of a spinning spacecraft.

FIG. 2 is a block diagram of the spacecraft gyrodynamic system model of FIG. 1 modified by the addition of the dynamic decoupler of the present invention.

FIG. 3 is a block diagram of a spacecraft based means for generating compensated input control torques according to the elementary inertial rule response.

FIG. 4 is a block diagram of an equivalent dynamic system model of the elementary inertial rule response of FIG. 3.

FIG. 5 is a block diagram of an alternative embodiment of the spacecraft based means of FIG. 3 for generating compensated input control torques employing additional derived cross-coupled feedback control torques.

FIG. 6 is a block diagram of an equivalent dynamic system model of the alternate realization of the elementary inertial rule response of FIG. 5.

FIG. 7 is a block system model diagram of a closed loop attitude control loop employing the dynamic decoupler of the present invention.

FIG. 8 is a block system model diagram of an alternative form of the closed loop attitude control loop of FIG. 7 employing the dynamic decoupler of the present invention explicitly showing the commanded acceleration, $p_c$.

DETAILED DESCRIPTION OF THE PREFERRED EMBODIMENT

Referring now to the drawings wherein like reference numerals are used to reference identical components in various views, FIG. 1 illustrates a gyrodynamic system model in block diagram form representing the rotation of a rigid body such as spinning spacecraft 20 as described by Euler's System Equations (1) and (2) given below.

$$L_x = I_x \omega_z + (I_z - I_y) \omega_z \omega_y \quad (1)$$

$$L_y = -(I_z - I_x) \omega_z \omega_x + I_y \omega_y \quad (2)$$

Spinning at constant rate, $\omega_z$, about its z axis with principal inertia components $I_x$, $I_y$, and $I_z$, spacecraft 20 experiences rates of rotation $\omega_x$, and $\omega_y$ about its x and y transverse axes 30 and 32, respectively, in response to control input torques $L_x$ and $L_y$ impressed at arrows A and B.

FIG. 1 depicts equations (1) and (2) in the frequency domain where S is the complex frequency variable and where:

$$C_1 = (I_z - I_y) \omega_z \quad (3)$$

$$C_2 = (I_z - I_x) \omega_z \quad (4)$$

Control input torques $L_x$ and $L_y$ are used to produce angular rates $\omega_x$ and $\omega_y$ about x and y transverse axes 30 and 32, respectively. Disadvantageously for spacecraft stability, control input torques $L_x$ and $L_y$ also produce cross-coupled feedback torque components $C_1=(I_z-I_x)\omega_z\omega_y$ and $C_2=(I_z-I_y)\omega_z\omega_x$ 34,36 respectively at arrows C and D, respectively. Cross-coupled feedback torque components $C_1$ 34 and $C_2$ 36 are added to the input control torques Lx and Ly at torque summing junctions 22 and 24, respectively, to produce cross-coupled torques $I_xS\omega_x$ and $I_yS\omega_y$ at input arrows E and F, respectively. The cross-coupled torques at input arrows E and F are multiplied in the frequency domain at integrating means 26 and 28 by factors $1/I_xS$ and $1/I_yS$ to produce resultant angular rates $\omega_x$ and $\omega_y$, respectively.

Solving the frequency domain gyroscopic cross-coupling model of FIG. 1 simultaneously for angular rates $\omega_x$ and $\omega_y$ results in equations (5) and (6) as follows:

$$\omega_x = \frac{I_y S L_x - (I_z - I_y)\omega_z L_y}{I_x I_y S^2 + (I_z - I_x)(I_z - I_y)\omega_z^2} \quad (5)$$

$$\omega_y = \frac{I_x S L_y + (I_z - I_x)\omega_z L_x}{I_x I_y S^2 + (I_z - I_x)(I_z - I_y)\omega_z^2} \quad (6)$$

Parameter values which result in gyroscopic cross-coupling can be determined using the denominators of equations (5) and (6). The undamped poles predict spacecraft nutation.

The gyrodynamic model of FIG. 1 is modified in FIG. 2 according to the present invention by the addition of the dynamic decoupler means generally denoted by numeral 38 including x and y rate gyro means 42 and 40, in communication with rate-to-torque conversion means $C_3$ 46 and $C_4$ 44, respectively, which generate decoupling input torques $(I_z-I_x)\omega_x\omega_z$ and $(I_z-I_y)\omega_y\omega_z$, equal and opposite to cross coupling feed back torque components $C_1$ 36 and $C_2$ 34 respectively, which are added or subtracted, as indicated at arrows G and H, at decoupler torque summing junctions 48 and 50 to produce the compensated input control torques $L_x'$ and $L_y'$, respectively, at arrows J and K. Resulting decoupled input control torques $L_x$ and $L_y$ at arrows L and M are thus impressed on the x and y transverse axes 30 and 32, respectively. The addition of the dynamic decoupler 38 greatly simplifies the expressions for $\omega_x$ and $\omega_y$ as given below:

$$\omega_x = \frac{L'_x}{I_xS} \quad (7)$$

$$\omega_y = \frac{L'_y}{I_yS} \quad (8)$$

Thus, corresponding decoupling input torques $(I_z-I_x)\omega_x\omega_z$ and $(I_z-I_y)\omega_y\omega_z$ generated at arrows G and H in opposition to the intrinsic cross-coupling of feedback torque components $C_1$ 36 and $C_2$ 34, result in control torques $L_x'$ and $L_y'$ being applied to cause spacecraft 20 to rotate without nutation about the x or y transverse axes 30 or 32, respectively.

The spacecraft 20 is now responsive to an instruction to change the direction of its inertial spin axis z according to the elementary inertial rule response function in which regular angular acceleration $\omega_x$ or $\omega_y$ is produced about one axis only. An input control torque $L_x$ or $L_y$ is commanded at arrow L or M about x or y transverse axis 30 or 32, respectively.

Rate gyro means 40 and 42, responsive to the rotation of x and y transverse axes 30 and 32, respectively, may be embodied by any conventional rotational motion sensing means, such as a ring laser gyroscope, dynamically-tuned gyroscope, fiber gyroscope, hemispherical resonant gyroscope or an electrostatically suspended gyroscope. In such a scheme, decoupling input torques $C_3$ 46 and $C_4$ 44 may be generated by any conventional mechanical torquing device effective to apply a mechanical torque to the body of a spacecraft such as magnetic actuators, electro magnetic actuators, or thrusters.

In the alternative, dynamic decoupler 38 may be embodied as a power amplifier converting the sum of two input control voltages into an output voltage representing a control torque. In such a scheme, rate gyro means 40 and 42 may be embodied electrically as a torque coil with a characteristic volts/radian second and a resistance R whose output signal I is a current representing the rotation of the spacecraft. The output current I of the torque coils or rate gyro means 40 and 42 is transmitted to rate-to-torque conversion means $C_3$ 46 and $C_4$ 44 which may be embodied as a voltage amplifier with a characteristic gain adapted to output the voltage necessary at the input of torque summing junctions 48 and 50 to output the decoupled input torques applied at arrows G and H, respectively. The two embodiments given above are merely representative of the many ways in which the dynamic decoupler 38 may be embodied.

Applying the dynamic decoupler 38 to the spacecraft gyrodynamic model 20 reduces FIG. 2 to only integrator means 26 and 28, $1/I_xS$ and $1/I_yS$ respectively, corresponding to the normal individual axes response of a non-rotating vehicle. Thus, the spacecraft can now be made to follow an instruction to change the inertial spin axis direction according to the elementary inertial rule response function modeled mathematically in FIG. 3. Designers of spinning spacecraft are now able to employ the simplified rules used in the design of controls for non-rotating vehicles.

In FIG. 3, the input functions $e^{-j\omega t}x^t$ indicated at 52 and the output function $e^{j\omega t}z^t$ indicated at 54 represent mathematically the conversion from inertial to body coordinates, and body to inertial coordinates, respectively. FIG. 3 also shows the means for generating the compensated input control torques $L_x'$ and $L_y'$ at arrows J and K, respectively, based on the commanded precession rate $p_c$, which can advantageously be located on the spinning spacecraft 20 rather than on the ground. The inertial or precession rate, $p_c$, applied to the input of the elementary inertial rule response function is given as:

$$p_c = e^{j\phi} \quad (9)$$

where $\phi$ is the inertial phase. In the elementary inertial rule response function as shown in FIG. 3, the inertial or precession rate, p output at arrow P, is equal simply to the commanded value $p_c$ input at arrow N. The rate of change of $p_c$ is naturally limited by the available torque. In addition, non-idealities such as noise or quantization may result in undesirable torques being produced. The equivalent dynamic system model 56 of the elementary inertial rule response of FIG. 3 has simply the value 1 as shown in FIG. 4.

Based on the observation that:

$$\omega_y = \omega_x + j\omega_x = d(e^{-j\omega t}z^t \, p)/dt = e^{-j\omega t}\, p = j\omega_z\omega_T, \quad (10)$$

an alternate embodiment of the elementary inertial rule response of FIG. 3 can be derived as shown in the system model of FIG. 5. Additional cross-coupled feedback terms $-\omega_x$ 58 and $\omega_z$ 60 derived from rate gyros means 62 and 64 are applied to summing junctions 66 and 68, respectively, in opposition to the intrinsic cross-coupling of spacecraft 20 to produce x and y inertial factors 70 and 72, respectively, with the result that the commanded input $p_c$ at arrow Q is simply the inertial acceleration, p desired at arrow R. The equivalent dynamic system model 74 of the alternate realization of the elementary inertial rule response has simply the value 1/S as shown in FIG. 6. The spacecraft is thus responsive to an instruction to change the direction of its inertial spin axis z according to the elementary inertial rule response function without nutation, providing for spinning spacecraft the benefits of a body-stabilized or non-rotating design.

Dynamic decoupling of the present invention allows the use of the elementary inertial rule response in the design of rotating spacecraft so that closed loop attitude control is straightforward. The simple attitude control laws associated with non-rotating vehicles now can be applied as shown in FIG. 7 where:

$$\theta = \frac{K\theta_1}{(s+K)} \quad (11)$$

The alternate embodiment of the elementary inertial rule response derived in FIG. 5 also can be employed in the design of closed loop attitude control as shown in FIG. 8 where:

$$\theta = \frac{K\theta_1}{(s^2 + K_r s + K_r K_p)} \quad (12)$$

The alternate embodiment of FIG. 8 is more familiar to the designer of non-rotating vehicle attitude control systems since it shows explicitly the commanded acceleration $p_c$ which can be readily scaled by a transverse inertia $I_T$ to define a commanded inertial torque:

$$L_c = I_T p_c \quad (13)$$

and an associated inertial torque limit $L_{max}$.

The advantage provided by the present invention is that for some applications, the benefits of a spinning bus such as a simplified thruster control system for orbit control, improved temperature environment for many payload elements, spin-averaging of body-fixed disturbances and gyro drift errors, and propellant management can be combined with the benefits of a body stabilized design such as freedom from nutation and hence improved performance.

From the foregoing discussion, it can be appreciated that a novel method is provided for controlling the precession of a spinning spacecraft about one axis without nutation. This method which begins by applying attitude control torques about the axes of the spacecraft to change the direction of the inertial spin axis of said spacecraft which results in the creation of first and second angular rates and associated first and second cross-coupling torques about said first and second axes, respectively, also includes the novel steps of generating compensating signals to offset the intrinsic cross-coupling torques, then altering the attitude control torques based on the compensating signals to offset the effects of said intrinsic cross-coupling torques. The novel step of generating the compensating signal is performed by first producing spacecraft dynamics signals in response to the application of the attitude control torques, then producing compensating signals to offset the intrinsic cross-coupling torques based on the spacecraft dynamics signals.

What is claimed is:

1. A method for reducing nutation induced during precession about a single axis of a spinning spacecraft having a gyro-based attitude control system, the method comprising:
    generating compensated control moment command signals which compensate for reactant cross-coupling torque produced about transverse axes by said gyro in reaction to an original control moment command signal by adding a rate gyro derived feedback term in opposition to the reactant cross coupling torque;
    communicating said compensated control moment command signals to said spacecraft; and
    applying said compensated control moment command signals to said spacecraft.

2. A method for reducing nutation induced by precession about a single axis of a spinning spacecraft having a gyro-based attitude control system, the method comprising:
    generating compensated control moment command signals compensated for reactant cross-coupling torque by including a rate gyro derived feedback term in opposition to the reactant cross-coupling torque;
    communicating said compensated control moment command signals to said spacecraft;
    applying said compensated control moment command signals to said spacecraft;
    determining amount of cross-coupling effect produced about said transverse axes by said gyro in reaction to said original control moment command signal;
    separating said original control moment command signal into x and y components;
    modifying said x and y components to compensate for said reactant cross-coupling torque; and
    converting said modified x and y component signals to control torque to form said compensated control moment command signals.

3. The method of claim 2, wherein said modifying is carried out using ring laser gyroscopes.

4. The method of claim 2, wherein said modifying is carried out using dynamically-tuned gyroscopes.

5. The method of claim 2, wherein said modifying is carried out using fiber gyroscopes.

6. The method of claim 2, wherein said modifying is carried out using hemispherical resonant gyroscopes.

7. The method of claim 2, wherein said modifying is carried out using electrostatically suspended gyroscopes.

8. The method of claim 2, wherein said converting is carried out using magnetic actuators.

9. The method of claim 2, wherein said converting is carried out using electromagnetic actuators.

10. The method of claim 2, wherein said converting is carried out using thrusters.

11. The method of claim 2, wherein the step of generating is performed on the ground.

12. The method of claim 2, wherein the step of generating is performed on board said spinning spacecraft.

* * * * *

UNITED STATES PATENT AND TRADEMARK OFFICE
CERTIFICATE OF CORRECTION

PATENT NO.   : 5,816,538
DATED        : October 6, 1998
INVENTOR(S)  : A. Dorian Challoner, et al It is certified that error appears in the above-identified patent and that said Letters Patent is hereby corrected as shown below:

On the title page, Item [*] Notice:,
Please remove Terminal Disclaimer from this patent.

Signed and Sealed this

Twenty-fourth Day of November, 1998

Attest:

BRUCE LEHMAN

Attesting Officer

Commissioner of Patents and Trademarks